(12) United States Patent
Hackl et al.

(10) Patent No.: US 10,910,993 B2
(45) Date of Patent: Feb. 2, 2021

(54) CIRCUIT ARRANGEMENTS FOR REDUCING POTENTIAL-INDUCED DEGRADATION IN PHOTOVOLTAIC MODULES

(71) Applicant: Bender GmbH & Co. KG, Gruenberg (DE)

(72) Inventors: Dieter Hackl, Fernwald (DE); Oliver Schaefer, Gruenberg (DE); Manfred Geiss, Ulrichstein (DE); Karl Schepp, Reiskirchen (DE)

(73) Assignee: BENDER GMBH & CO. KG, Gruenberg (DE)

( * ) Notice: Subject to any disclaimer, the term of this patent is extended or adjusted under 35 U.S.C. 154(b) by 565 days.

(21) Appl. No.: 15/596,083

(22) Filed: May 16, 2017

(65) Prior Publication Data

US 2017/0353155 A1  Dec. 7, 2017

(30) Foreign Application Priority Data

Jun. 3, 2016  (DE) .......................... 10 2016 209 799

(51) Int. Cl.
*H02S 50/10* (2014.01)
*H02J 3/38* (2006.01)
*H02S 50/00* (2014.01)

(52) U.S. Cl.
CPC .............. *H02S 50/10* (2014.12); *H02J 3/383* (2013.01); *H02S 50/00* (2013.01)

(58) Field of Classification Search
CPC .......... H02S 50/10; H02S 50/00; H02J 3/383; G01R 27/18
See application file for complete search history.

(56) References Cited

U.S. PATENT DOCUMENTS 5,712,572 A * 1/1998 Tamechika .............. H02S 50/10
324/551
2017/0214362 A1* 7/2017 Basu ....................... H02S 50/10

FOREIGN PATENT DOCUMENTS

| CN | 103475271 A | 12/2013 |
|---|---|---|
| CN | 203690905 U | 7/2014 |
| DE | 202006008936 | 9/2006 |

(Continued)

*Primary Examiner* — Rexford N Barnie
*Assistant Examiner* — Elim Ortiz
(74) *Attorney, Agent, or Firm* — King & Schickli, PLLC

(57) ABSTRACT

The invention relates to circuit arrangements for reducing potential-induced degradation in photovoltaic modules of a photovoltaic generator, said circuit arrangements comprising an insulation monitoring device for a temporally continuous insulation monitoring of the photovoltaic generator. Furthermore, the invention relates to a photovoltaic system comprising a circuit arrangement for reducing potential-induced degradation in photovoltaic modules, said photovoltaic system comprising a photovoltaic generator and an insulation monitoring device for a temporally continuous insulation monitoring of the photovoltaic generator. Different solutions are proposed which enable reducing potential-induced degradation while simultaneously continuously monitoring insulations. The circuit arrangements according to the invention rest upon an insulation monitoring device interacting with measures based circuit technology for influencing potentials in a photovoltaic module.

3 Claims, 3 Drawing Sheets

(56) References Cited

FOREIGN PATENT DOCUMENTS

| DE | 102010039692 A1 | 3/2012 |
|----|-----------------|--------|
| DE | 102013225946 A1 | 6/2015 |
| DE | 102015102310 A1 | 8/2016 |
| EP | 2086020         | 5/2009 |
| EP | 2466320 A2      | 6/2012 |

\* cited by examiner

CIRCUIT ARRANGEMENTS FOR REDUCING POTENTIAL-INDUCED DEGRADATION IN PHOTOVOLTAIC MODULES

This application claims the benefit of German Patent Application No. 10 2016 209 799.7, filed Jun. 3, 2016, the disclosure of which is incorporated herein by reference.

TECHNICAL FIELD

The invention relates to circuit arrangements for reducing potential-induced degradation in photovoltaic modules of a photovoltaic generator, comprising an insulation monitoring device for a temporally continuous insulation monitoring of the photovoltaic generator.

Furthermore, the invention relates to a photovoltaic system comprising a circuit arrangement for reducing potential-induced degradation in photovoltaic modules, comprising a photovoltaic generator and comprising an insulation monitoring device for a temporally continuous insulation monitoring of the photovoltaic generator.

BACKGROUND

A sufficiently high inverter direct voltage is required for achieving adequate inverter efficiency in a photovoltaic system. Therefore, a plurality of photovoltaic modules of a photovoltaic generator is connected serially to a string, wherein system voltages (electric potentials of individual solar cells of the photovoltaic generator to ground) typically arise, which range from 400 V to 1500 V. Depending on the type of inverter, these potentials adjust themselves freely so that a maximum electric potential comprising half the system voltage can be presumed between a solar cell of the photovoltaic generator and a grounded modular frame in symmetrical insulation resistance ratios. The differences in potential can cause stray currents between the solar cells and modular frames, said stray currents being able to lead to irreversible damage in thin-film modules and to partially reversible cell degradation in cell types based on crystalline silicon.

This damage to the solar cell, known as potential-induced degradation (PID), leads to a considerable decrease in the performance of the photovoltaic generator.

Experts believe the cause to be the migration of charge carriers present in the outer layer of the cell due to production processes, said charge carriers being driven by the antireflection coating under the influence of an outer electric field (presumably positively charged sodium ions against a negative potential of the cell to ground) and causing local short circuits at the cell surface or entering the electrically conductive TCO coating (transparent conductive oxide) and causing an electrochemical corrosion there.

According to current scientific research, decreases in performance caused by PID can usually be hindered by avoiding negative electrical fields from occurring by grounding the negative pole of the photovoltaic generator. This can be achieved by using an inverter comprising galvanic insulation, for example, by ideally grounding the negative pole of the photovoltaic generator in the inverter itself. Via the functional grounding of the negative connection of the photovoltaic generator, an electric field arises, in which positively charged charge carriers are pulled towards the negative pole and consequently away from the TCO coating.

It is discovered in the utility model DE 20 2006 008 936 U1, however, that a functional grounding of the negative connection of the photovoltaic generator according to the state of the art cannot hinder damage to the module in the long term. The document therefore proposes a circuit by means of which the negative connection of the photovoltaic generator is increased to a positive potential to ground.

Another possibility of increasing potential is disclosed in the patent EP 2 086 020 B1 in conjunction with increased protective measures against lightning strikes. In this document, a photovoltaic system having an increase in potential is described, said photovoltaic system comprising a voltage source whose negative pole is laid on ground potential and whose positive pole is connected to the positive pole of the photovoltaic generator.

However, these measures known from the state of the art comprise significant disadvantages regarding safety. Thus, the functional grounding of the negative connection of the photovoltaic generator via a fuse prevents a temporally continuous monitoring of the insulation resistance level using an insulation monitoring device (IMD). Protection against fire hazards is not ensured in particular when symmetrical insulation faults occur.

Depending on the chosen approach, increasing the potential of the photovoltaic generator by means of the voltage source connects the negative or the positive connection of the photovoltaic generator via the generally low-impedance internal resistance of the voltage source to ground. A continuous monitoring of the insulation resistance level is also prevented here using an insulation monitoring device. Depending on the maintenance concept, occurring symmetrical faults are identified too late or not at all. The risk of fire increases in this instance as well.

So far, these problems could be circumvented by determining the insulation resistance level of the photovoltaic generator once daily in a separate measurement before starting the operation of the inverter. For this purpose, all low-impedance connections of the photovoltaic generators comprising a ground, such as the fuse or the voltage source, are disconnected and an insulation monitoring device is activated.

The disadvantage of this procedure is that the photovoltaic generator is monitored in a temporally very limited scope. The occurring operating states are not monitored in a temporally continuous manner or with a sufficiently broad coverage. Should the clearance measurement always be conducted at sunrise, for example, in order to maintain a highest possible electric yield during the day, neither an operating mode comprising maximum generator voltage nor an operating mode comprising maximum generator performance nor an operating mode comprising a maximum operating temperature are to be expected. Different states of condensation are also not monitored. Faults which only occur in certain operating states are not discovered ahead of time despite monitoring; instead, they are discovered when, for example, the damage in the electric insulation of the photovoltaic generator is so large that it has already resulted in a failure or, in a worst case scenario, a fire.

The object of the invention at hand is therefore to counteract potential-induced degradation in photovoltaic modules of a photovoltaic generator and to simultaneously enable a temporally continuous insulation monitoring of the photovoltaic generator.

SUMMARY

This object is attained in a first solution by symmetrically connecting the insulation monitoring device between a positive pole of the photovoltaic generator and ground and between a negative pole of the photovoltaic generator and ground and by the circuit arrangement comprising an impulse coupling circuit, which is connected symmetrically between the positive pole of the photovoltaic generator and ground and between the negative pole of the photovoltaic generator and ground for coupling positive voltage impulses.

Based on the discovery that the effects of potential-induced degradation is accelerated by increasing a negative voltage amplitude to ground, it is presumed that increasing the voltage amplitude comprising opposite polarity subdues the PID effect in an amplified manner. The basic concept of this first solution according to the invention therefore rests upon applying short voltage impulses comprising high amplitude (larger than 50 V) to ground to the photovoltaic generator in order to terminate or even reverse a movement of the charge carrier in the cells of the photovoltaic module. The pulse-duty factor and the voltage amplitude are to be adjusted specifically to the photovoltaic module in order to prevent the effect of degradation for the cell type in use as effectively as possible. Studies show that a non-linear connection exists between voltage amplitude and hindering PID. In order to achieve a largest possible effect for preventing PID, a largest possible impulse voltage is chosen, an upper threshold being provided via the dielectric strength of the photovoltaic modules. Units of a few seconds seem practical as an impulse duration.

The insulation monitoring device and impulse coupling circuit are each connected symmetrically to ground, i.e. to the positive pole as well as the negative pole of the photovoltaic generator.

Advantageously, the impulse coupling circuit is realized as a capacitive coupling circuit.

The capacitive coupling of the voltage pulse enables a temporally continuous insulation monitoring since the ohmic resistance is not negatively influencing the measurement of the insulation resistance.

In another advantageous embodiment, the impulse coupling circuit is integrated into the insulation monitoring device.

Merging the functionalities of insulation monitoring and impulse coupling in an expanded insulation monitoring device leads to simplifications based on circuit technology as well as to an effective execution of testing measures and monitoring measures.

The object of the invention is attained by a second solution by the insulation monitoring device being connected asymmetrically to either a positive pole or a negative pole of the photovoltaic generator and ground and by a low-impedance voltage source being connected serially to the coupling of the insulation monitoring device and serially to the photovoltaic modules of the photovoltaic generator.

In this solution, the insulation monitoring device is connected asymmetrically, i.e. connected either to the positive conductor or the negative conductor of the photovoltaic generator. A low-impedance voltage source for increasing voltage is connected in a row to the conductor with the photovoltaic module of the photovoltaic generator, the insulation monitoring device being connected to said conductor.

Asymmetrically connecting the insulation monitoring device causes the internal resistance of the insulation monitoring device in conjunction with the voltage source connected in a row to lead to an increase in potential of the photovoltaic module to ground. Continuously monitoring the insulation is possible without any limitations.

A particular advantage of this solution is that the PID inhibiting effect kicks in even at night when the photovoltaic module itself is mostly without voltage—as long as the voltage source connected in a row and the insulation monitoring device are active.

A third solution is found in which the insulation monitoring device is connected asymmetrically between either the positive pole or the negative pole of the photovoltaic generator and ground and a low-impedance voltage source is connected in a row to the insulation monitoring device to ground.

In this solution, the insulation monitoring device is also connected asymmetrically, i.e. connected either to the positive conductor or the negative conductor of the photovoltaic generator.

A PID inhibiting effect arises when an insulation resistance of the photovoltaic generator is measured by the insulation monitoring device, said insulation resistance being over the value of the internal resistance of the insulation monitoring device. A continuous insulation monitoring is possible without any limitations in this instance as well.

In another embodiment, the low-impedance voltage source is integrated into the insulation monitoring device as an offset voltage source for measuring the voltage of the insulation monitoring device.

As an alternative to the an embodiment of the voltage source as a separate module, the voltage source connected in a row can also be integrated into an insulation monitoring device as a type of voltage offset for measuring voltage.

A fourth solution is found, in which the insulation monitoring device is connected symmetrically between a positive pole of the photovoltaic generator and ground and between a negative pole of the photovoltaic generator and ground and in which the circuit arrangement comprises an insulation fault location device comprising a test current source and a control device, said insulation fault location device being connected symmetrically between the positive pole of the photovoltaic generator and ground and between the negative pole of the photovoltaic generator and ground and said control device controlling the mode of operation of the insulation monitoring device and the insulation fault location device such that a temporally continuous or a nearly temporally continuous insulation monitoring is carried out and potential-induced degradation is reduced by controlling the test current of the test current source.

In this solution, the insulation monitoring device as well as the insulation fault location device is connected symmetrically to ground, i.e. to the positive pole as well as to the negative pole of the photovoltaic generator.

The fourth solution rests upon the test current generated by the test current source of the insulation fault location device being used and controlled such that, on the one hand, a PID inhibited increase in potential of the photovoltaic module to ground arises.

On the other hand, the interaction of the functions insulation monitoring and insulation fault location is controlled such that a temporally continuous or a nearly temporally continuous insulation monitoring as well as a PID inhibiting effect is achieved.

In the case of the nearly temporally continuous insulation monitoring, the mode of operation of the insulation monitoring and test current supply is regulated in such a manner that one of the two functions (insulation monitoring or insulation fault location) becomes inactive when the respective other function is active. However, the activity insulation monitoring has to be sufficiently long and occur frequently enough in order to ensure a reliable monitoring of the insulation resistance in practice. The measuring duration of the insulation monitoring depends on the size of the system leakage capacitance and other interfering components present in the system, amongst other things. An insulation monitoring activity having a value of 5 min per hour, for example, can be practical.

Furthermore, the test current source of the insulation fault location device is carried out at such high impedance that the test current of the test current source serves as a measuring current for insulation monitoring. In this embodiment, the test current source can be considered as an ideal current source and a temporally continuous insulation monitoring is possible, i.e. an insulation monitoring without interruptions, said test current carrying out the function of the measuring current for insulation monitoring besides fulfilling the task of increasing potential.

Preferably, the insulation monitoring device, the insulation fault location device and the control device are arranged so as to be integrated in a combination device.

This enables efficiently implementing the required functionalities based on circuit technology.

A fifth embodiment is found in which the insulation monitoring device is connected symmetrically between a positive pole of the photovoltaic generator and ground and between a negative pole of the photovoltaic generator and ground and in which the photovoltaic generator comprises a shielding, which is laid on a positive potential by means of a high-impedance voltage source.

An insulation monitoring device connected symmetrically to ground, i.e. connected to the positive pole as well as the negative pole of the photovoltaic generator, monitors the insulation resistance.

The shielding consisting of a conductive shielding foil is insulated double with respect to the photovoltaic module and with respect to the grounded modular frame according to the requirements regarding protection against electric shock. Since inhibiting cell degradation is based on the design of an electrostatic field to ground, it is not required to lay the shielding foil on a high and positive potential to ground via a low-impedance voltage source. Instead, the voltage source is electrically connected to the shielding via a high-impedance protective impedance safely limiting current. This measure moreover enables an additional protection against electric shock.

A continuous insulation monitoring is possible without limitations in this instance since the photovoltaic generator is not galvanically connected to the insulated shielding foil.

BRIEF DESCRIPTION OF THE DRAWING FIGURES

Further advantageous embodiments can be taken from the following description and the drawing, which describe a preferred embodiment of the invention at hand by way of examples. In the figures, FIG. 1 shows a photovoltaic system comprising a circuit arrangement according to the invention and according to a first solution;

Figure 1:
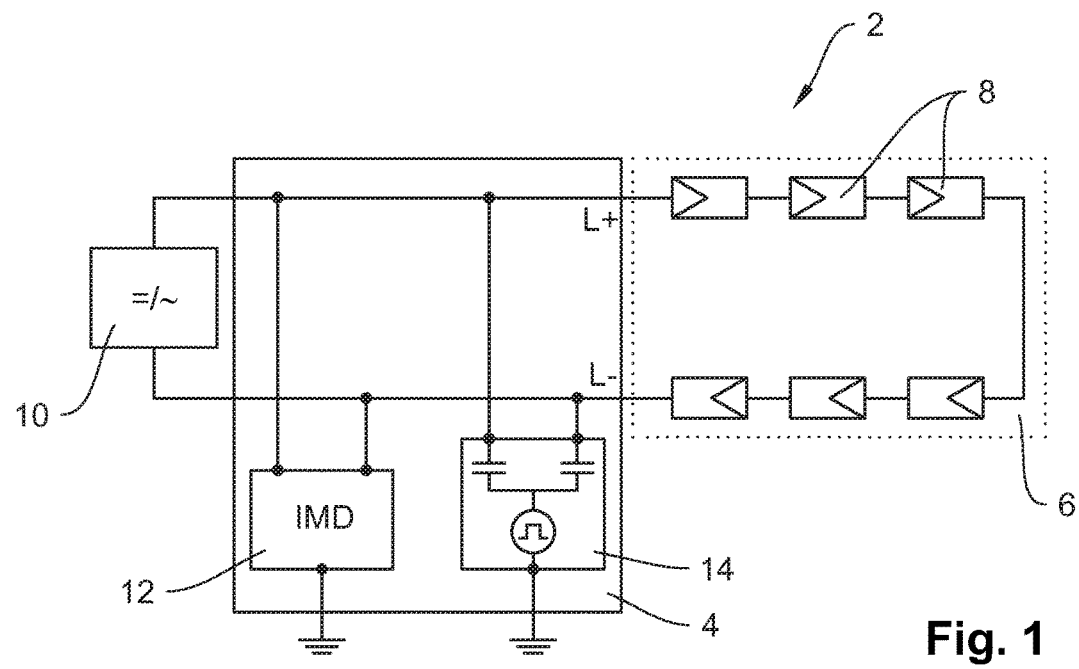

FIG. 1 shows a photovoltaic system 2 comprising a circuit arrangement 4 according to the invention and according to a first solution. The photovoltaic system 2 comprises a photovoltaic generator 6 made of photovoltaic modules 8, an inverter 10 and the circuit arrangement 4 for reducing potential-induced degradation in photovoltaic modules 8.

The circuit arrangement 4 consists of an insulation monitoring device 12 and an impulse coupling circuit 14. The ground connection of the insulation monitoring device 12 and the ground connection of the impulse coupling circuit 14 are laid on a ground potential and the corresponding system connections of the insulation monitoring device 12 and the impulse coupling circuit 14 are symmetrically connected to the positive pole L+ and the negative pole L− of the photovoltaic generator 6.

Figure 2:
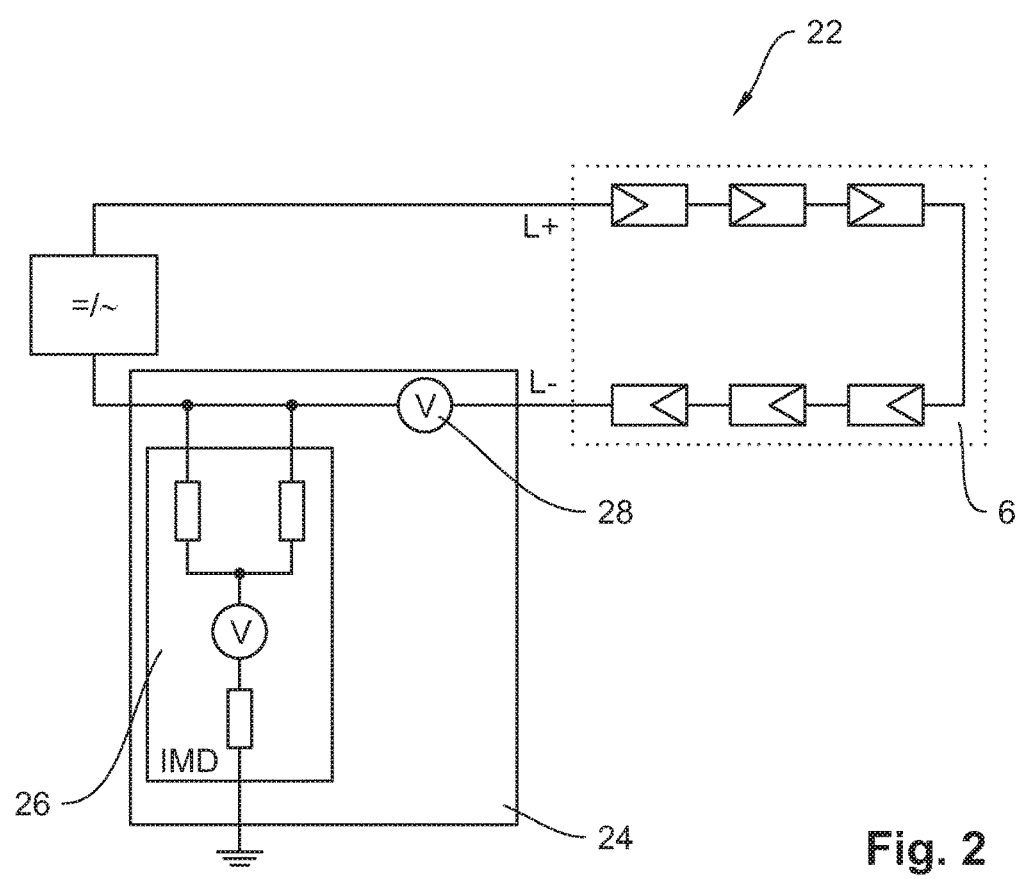
FIG. 2 shows a photovoltaic system comprising a circuit arrangement according to the invention and according to a second solution.

In FIG. 2, a photovoltaic system 22 comprising a circuit arrangement 24 according to the invention and according to a second solution is shown.

The circuit arrangement 24 consists of an insulation monitoring device 26 and a low-impedance voltage source 28. The insulation monitoring device 26 is connected asymmetrically to the photovoltaic generator 6, i.e. only with the negative pole L− of the photovoltaic generator 6, and the voltage source 28 is serially connected to the conductor of the negative pole L−.

Figure 3:
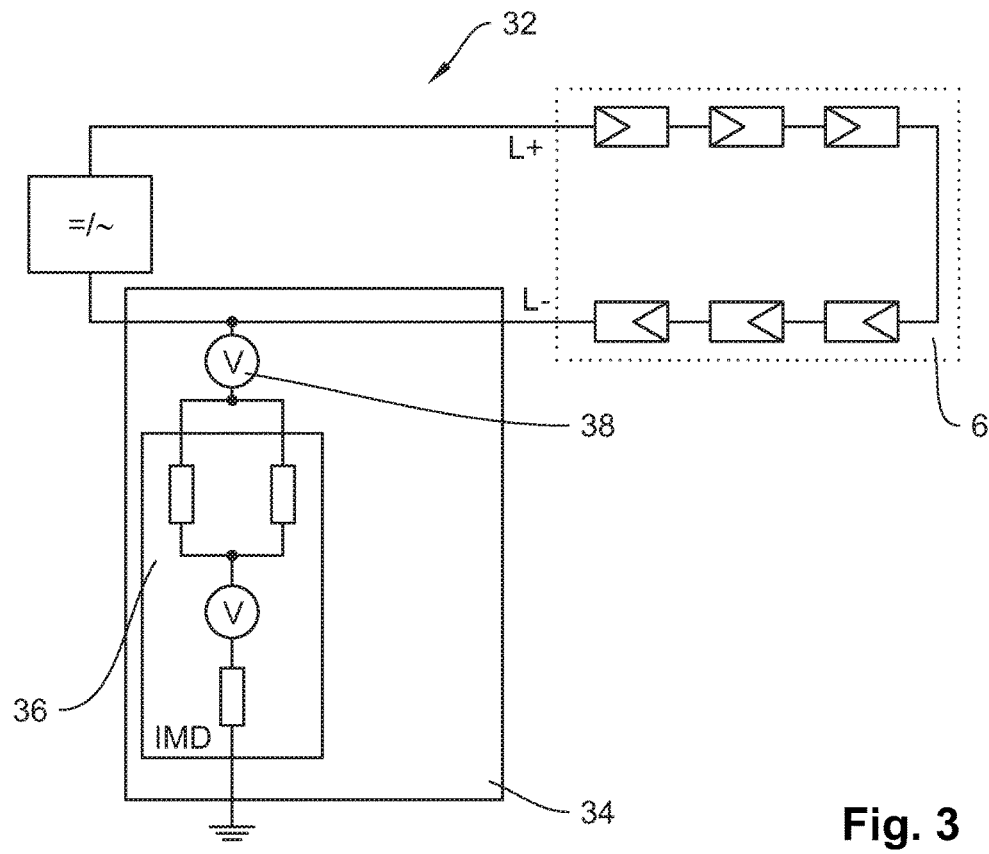
FIG. 3 shows a photovoltaic system comprising a circuit arrangement according to the invention and according to a third solution.

FIG. 3 shows a photovoltaic system 32 comprising a circuit arrangement 34 according to the invention and according to a third solution.

The circuit arrangement 34 consists of an insulation monitoring device 36 and a low-impedance voltage source 38 connected serially to the insulation monitoring device 36. The circuit arrangement 34 is connected asymmetrically to the negative pole L− of the photovoltaic generator 6.

Figure 4:
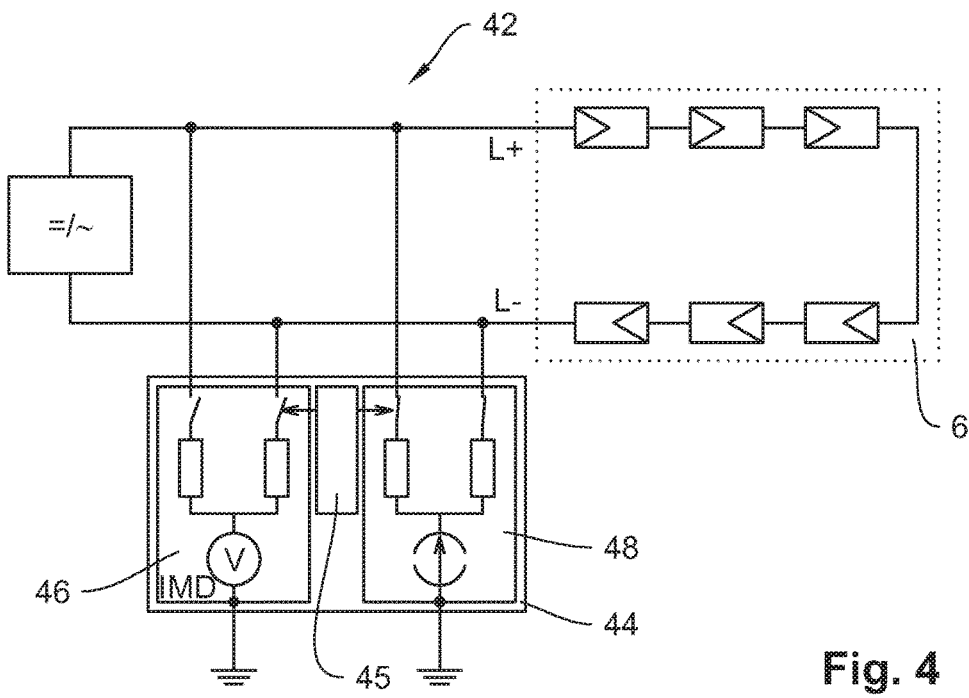
FIG. 4 shows a photovoltaic system comprising a circuit arrangement according to the invention and according to a fourth solution.

FIG. 4 shows a photovoltaic system 42 comprising a circuit arrangement 44 according to the invention and according to a fourth solution.

The circuit arrangement 44 consists of an insulation monitoring device 46, an insulation fault location device 48 having a test current source and a control device 45, these functionalities being integrated in a combined device. The insulation monitoring device 46 and the insulation fault location device 48 are each symmetrically connected to the photovoltaic generator 6, i.e. to the positive conductor L+ of the photovoltaic generator 6 as well as to the negative conductor L− of the photovoltaic generator 6.

The control device 45 controls the test current source of the insulation fault location device 48 in such a manner that the PID inhibiting effect arises via an increase in potential of the photovoltaic module to ground. In the example showing the separation of measuring current for insulation monitoring from the test current, the control device 45 controls the mode of operation by alternatingly activating the insulation monitoring device 46 and the insulation fault location device 48 such that a nearly temporally continuous insulation monitoring and a reduction of potential-induced degradation takes place.

Figure 5:
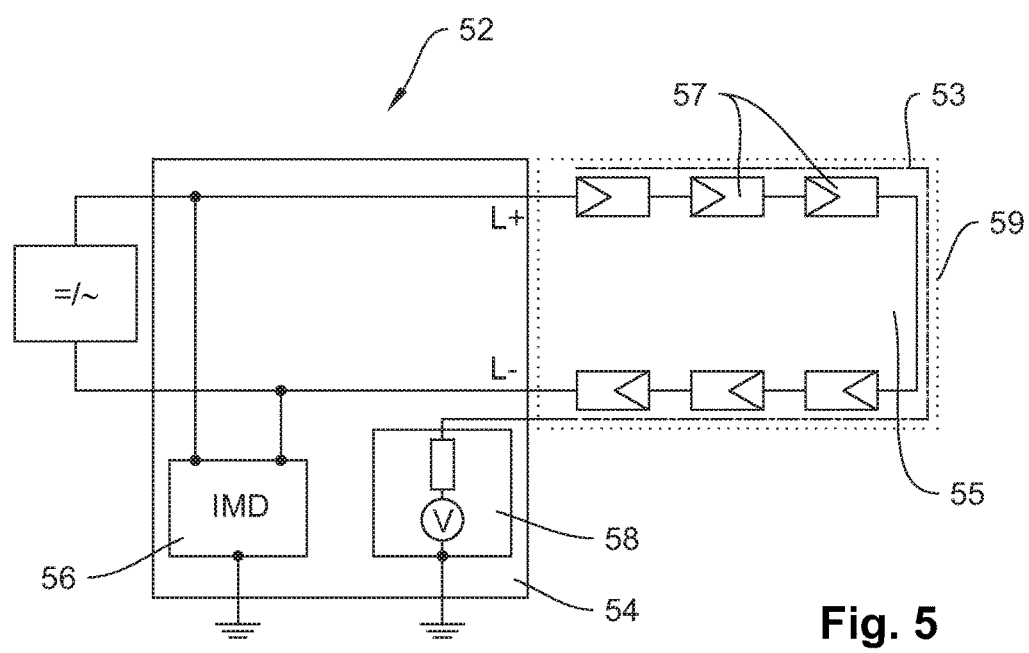
FIG. 5 shows a photovoltaic system according to the invention comprising a photovoltaic generator and a circuit arrangement according to a fifth solution.

FIG. 5 shows a photovoltaic system 52 according to the invention comprising a photovoltaic generator 55 and a circuit arrangement 54 according to a fifth solution.

The photovoltaic generator 55 is provided with a shielding 53 which is realized as a conductive shielding foil and inhibits charge carriers from moving between the photovoltaic modules 57 and the grounded module frame 59.

The circuit arrangement 54 comprises an insulation monitoring device 56 symmetrically connected to the positive pole L+ and the negative pole L− of the photovoltaic generator 55 and a high-impedance voltage source 58, which lays the shielding 53 of the photovoltaic generator 55 on a high positive potential to ground.

The invention claimed is:

1. A circuit arrangement for reducing potential-induced degradation in photovoltaic modules of a photovoltaic generator, comprising:
an insulation monitoring device for a temporally continuous insulation monitoring of the photovoltaic generator, characterized in that the insulation monitoring device is connected symmetrically between a positive pole of the photovoltaic generator and ground and between a negative pole of the photovoltaic generator and ground and that the circuit arrangement comprises an insulation fault location device having a test current source generating a test current separate from a measuring current for insulation monitoring and a control device, said insulation fault location device being connected symmetrically between the positive pole of the photovoltaic generator and ground and between the negative pole of the photovoltaic generator and ground and said control device controls the interaction of the function insulation monitoring of the insulation monitoring device and the function insulation fault location of the insulation fault location device such that a temporally continuous or a nearly temporally continuous insulation monitoring is carried out and that the potential-induced degradation is reduced by controlling a test current of the test current source.

2. The circuit arrangement according to claim 1, characterized in that the test current of the insulation fault location device is carried out at such an impedance that the test current of the test current source serves as a measurement current for insulation monitoring.

3. The circuit arrangement according to claim 1, characterized in that the insulation monitoring device, the insulation fault location device and the control device are arranged so as to be integrated in a combination device.

* * * * *